United States Patent
Kim et al.

(10) Patent No.: US 9,786,876 B2
(45) Date of Patent: Oct. 10, 2017

(54) APPARATUS FOR WATERPROOFING BATTERY COVER IN A PORTABLE TERMINAL

(71) Applicant: Samsung Electronics Co., Ltd., Gyeonggi-do (KR)

(72) Inventors: Jin-Yong Kim, Gyeonggi-do (KR); Hyuk-Sung Kwon, Gyeonggi-do (KR); Jong-Cheon Wee, Gyeonggi-do (KR); Ji-Gu Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 802 days.

(21) Appl. No.: 13/826,692

(22) Filed: Mar. 14, 2013

(65) Prior Publication Data
US 2013/0252061 A1 Sep. 26, 2013

(30) Foreign Application Priority Data

Mar. 21, 2012 (KR) ........................ 10-2012-0028702

(51) Int. Cl.
*H01M 2/10* (2006.01)
*G06F 1/16* (2006.01)
*H04M 1/02* (2006.01)
*H04M 1/18* (2006.01)
*H04B 1/3888* (2015.01)

(52) U.S. Cl.
CPC ........ *H01M 2/1022* (2013.01); *G06F 1/1656* (2013.01); *H04B 1/3888* (2013.01); *H04M 1/0262* (2013.01); *H04M 1/18* (2013.01); *G06F 1/1626* (2013.01); *H01M 2220/30* (2013.01)

(58) Field of Classification Search
USPC .................................................... 429/96–100
See application file for complete search history.

(56) References Cited

U.S. PATENT DOCUMENTS

| | | | |
|---|---|---|---|
| 2009/0111539 A1* | 4/2009 | Matsuda ............... | G06F 1/1616 455/575.3 |
| 2010/0085691 A1* | 4/2010 | Yeh ...................... | H04M 1/0249 361/679.01 |
| 2011/0110022 A1 | 5/2011 | Kumagai et al. | |
| 2012/0045679 A1* | 2/2012 | Ishida ................. | H01M 2/1066 429/100 |
| 2012/0322516 A1 | 12/2012 | Kitagawa et al. | |

FOREIGN PATENT DOCUMENTS

| | | |
|---|---|---|
| CN | 201267065 Y | 7/2009 |
| CN | 102822575 A | 12/2012 |
| WO | 2011/114614 A1 | 9/2011 |

OTHER PUBLICATIONS

Chinese Search Report dated Oct. 10, 2016.

* cited by examiner

*Primary Examiner* — Osei Amponsah
(74) *Attorney, Agent, or Firm* — Cha & Reiter, LLC

(57) ABSTRACT

An apparatus for waterproofing a battery cover in a portable terminal is provided, in which a rear case includes an opening for accommodating a battery, a battery cover covers the rear case, and a waterproofing module is disposed between the rear case and the battery cover. The waterproofing module is disposed along an inner periphery of the opening, thus sealing a water infiltration path between the battery cover and the rear case.

8 Claims, 4 Drawing Sheets

APPARATUS FOR WATERPROOFING BATTERY COVER IN A PORTABLE TERMINAL

CLAIM OF PRIORITY

This application claims priority pursuant to 35 U.S.C. §119(a) to and the benefit of a Korean Patent Application filed in the Korean Intellectual Property Office on Mar. 21, 2012 and assigned Serial No. 10-2012-0028702, the contents of which are incorporated herein by reference in its entirety.

BACKGROUND OF THE INVENTION

Field of the Invention

The present invention relates to a portable terminal and more particularly, to an apparatus for waterproofing a battery cover of a portable terminal in order to prevent water infiltration into the battery compartment through the battery cover.

Description of the Related Art

Portable terminals have recently evolved to multimedia devices that can provide a variety of additional services such as showing multimedia presentations, providing functions such as an electronic note taking, gaming, scheduling, and other professional and personal productivity functions. Therefore, the portable terminals have diverse functions available through connections to external devices, such as for example, listening to music, viewing movies, photographing, etc.

A portable terminal includes a battery for supplying power and a battery cover covers the battery. Along with the proliferation of portable terminals, there is an increasing demand for waterproof portable terminals in daily living. Especially, considering that a battery cover is removable from a portable terminal, a waterproofing structure is needed for the battery cover. A technology of preventing water infiltration into a battery cover is disclosed in U.S. Published Patent Application No. 2011/0110022 entitled "PORTABLE TERMINAL DEVICE WITH WATERPROOF STRUCTURE" (published on May 12, 2011).

FIG. 1 illustrates a conventional battery cover waterproofing apparatus for a portable terminal.

Referring to FIG. 1, a conventional battery cover waterproofing apparatus 10 includes a battery cover 11 mounted on a rear surface of the portable terminal and an inner waterproofing device 12 attached to the interior of the battery cover 11. To allow the inner waterproofing device 12 to be attached to the interior of the battery cover 11, the battery cover waterproofing apparatus 10 must be made thicker. Moreover, additional use of an attachment material further increases the thickness of the battery cover waterproofing apparatus 10. Since the battery cover 11 and the inner waterproofing device 12 are integrally formed, removal of the battery cover 11 from the rear surface of the portable terminal results in detachment of the inner waterproofing device 12 from the interior of the battery cover 11 due to bending of the battery cover 11. For example, portable terminals are generally classified into a folder type, a sliding type, and a bar type. Particularly, a bar-type portable terminal has a battery cover 11 mounted across a whole rear surface thereof in view of its design. When the battery cover 11 is removed from the portable terminal, the battery cover 11 is bent to some extent. The bending of the battery cover 11 generates force to detach the inner waterproofing device 12 from the interior of the battery cover 11. As a result, the inner waterproofing device 12 is easily removed.

FIG. 2 illustrates another conventional battery cover waterproofing apparatus for a portable terminal.

Referring to FIG. 2, a conventional battery cover waterproofing device 20 includes a battery cover 21 and an O-ring 22. The O-ring 22 is fit around the battery cover 21 and a protrusion 23 is formed to be engaged with a rear case of the portable terminal around the o-ring 22. To block water from leaking into a battery, the protrusion 23 has a four-sided opening structure.

It is difficult to injection-mold the four-sided opening, that is, to create undercuts on four surfaces. Moreover, to achieve the four-sided opening structure, the battery cover 21 is injection-molded to have a flat surface without any curve. Therefore, limitations are imposed on the design of the battery cover 21.

It is also difficult to injection-mold an engagement structure for engaging the battery cover 21 with the portable terminal, together with the four-sided opening structure. The O-ring 20 can readily become separated or removed from the four-sided opening structure, making waterproofing less effective. Additionally, if the O-ring 20 is not fit perfectly around the four-sided opening structure, waterproofing effectiveness is decreased. Another drawback of the battery cover waterproofing apparatuses illustrated in FIGS. 1 and 2 is that the battery cover must be made thicker due to the inner waterproofing device or the four-sided opening structure.

SUMMARY OF THE INVENTION

An aspect of embodiments of the present invention is to address at least the problems and/or disadvantages and to provide at least the advantages described below. Accordingly, an aspect of exemplary embodiments of the present invention is to provide an apparatus for waterproofing a battery cover in a portable terminal in order to block a water infiltration path into the battery cover as well as to make the portable terminal slim.

In accordance with an exemplary embodiment of the present invention, there is provided an apparatus for waterproofing a battery cover in a portable terminal, in which a rear case includes a compartment with an opening for accommodating a battery, a battery cover for covering the battery compartment, which covers the rear case battery compartment opening, and a waterproofing module is disposed between the rear case and the battery cover. The waterproofing module is disposed along an inner periphery of the opening, thus sealing a water infiltration path between the battery cover and the rear case.

The waterproofing module may include a waterproofing plate disposed along a periphery of a bottom surface of the opening, and a waterproofing rubber formed integrally with the waterproofing plate and being pressed against an inner surface of the battery cover, when the battery cover is mounted on the rear case.

The waterproofing rubber may include a rubber protrusion protruding toward the inner periphery of the opening, and the rubber protrusion may be pressed against the inner surface of the battery cover, for sealing the water infiltration path.

The waterproofing module may further include an engagement member for engaging the waterproofing module along the periphery of the bottom surface of the opening.

The engagement member may include a double-sided tape.

The apparatus may further include a secure locking unit for stably locking the battery cover with the rear case.

The secure locking unit may include a first engagement hole penetrating interior and exterior of the battery cover, a second engagement hole formed into the rear case, communicating with the first engagement hole, and an engagement member for being inserted into the second engagement hole through the first engagement hole.

The engagement member may include a catching portion protruding toward the inside of the second engagement hole and the second engagement hole includes a catching groove formed into an inner surface of the second engagement hole, communicating with the second engagement hole. After the engagement member is accommodated in the second engagement hole through the first engagement hole, the catching portion may be moved to the catching groove and locked in the catching groove by rotation of the engagement member.

In accordance with another embodiment of the present invention, the waterproofing module may include a waterproofing plate disposed along a periphery of a bottom surface of the opening, including a protrusion bent to protrude toward an inner surface of the opening, and an O-ring inserted under the protrusion and pressed against the protrusion and an inner surface of the battery cover.

The apparatus may further include an engagement portion for engaging the waterproofing plate with the bottom surface of the opening, and an engagement member for tightly engaging the waterproofing plate with the bottom surface of the opening.

The engagement portion may penetrate through the waterproofing plate, the engagement member, and the bottom surface of the opening.

The engagement member may include a double-sided tape.

The battery cover may be disposed between the inner surface of the opening and the protrusion and the O-ring may be pressed against the inner surface of the battery cover, for sealing the battery cover.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS

Figure 1:
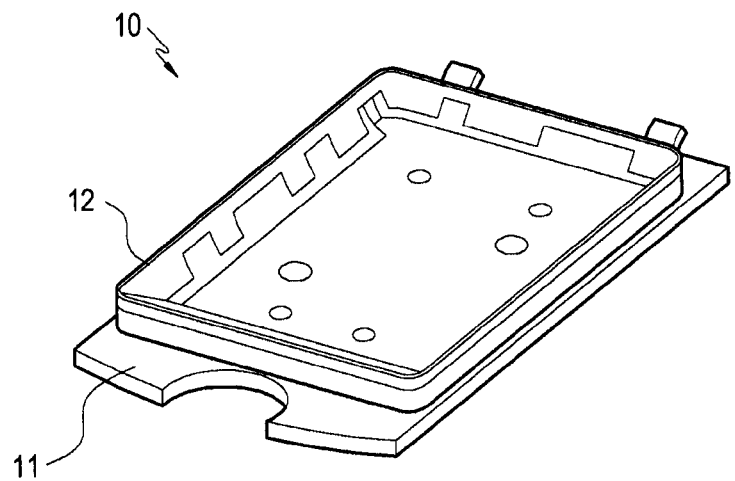
FIG. 1 illustrates a conventional battery cover waterproofing apparatus in a portable terminal.
Figure 2:
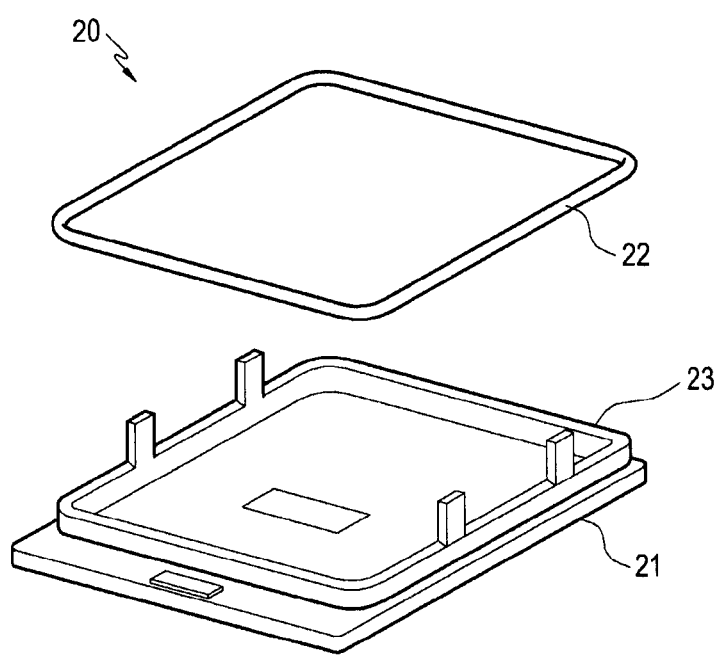
FIG. 2 illustrates another conventional battery cover waterproofing apparatus in a portable terminal.

Embodiments of an apparatus for waterproofing a battery cover in a portable terminal according to the present invention will be described below with reference to the attached drawings. For clarity and convenience, the thickness of lines and the sizes of components may be exaggerated in the drawings. The terms as set forth herein are defined, taking into account functions of the present invention and may be changed according to the intention of a user or operator or customs. Accordingly, the definitions of the terms should be based on the whole contents of the specification.

While ordinals such as first, second, etc. are used in the embodiments of the present invention, they simply distinguish objects with the same name from each other and the order of the objects can be freely set. A description of a previous-numbered object can be applied to a next-numbered object.

Figure 3:
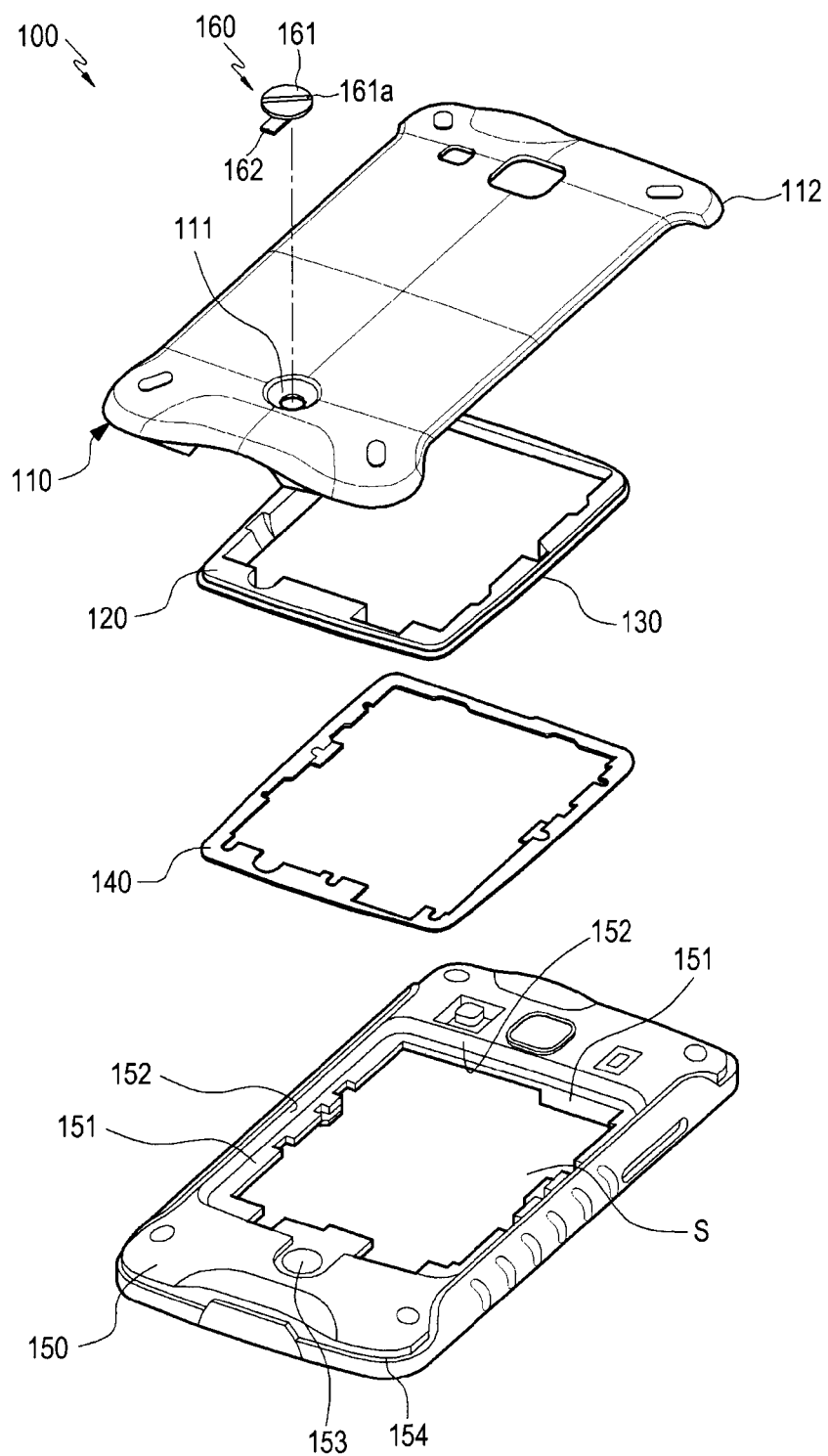
FIG. 3 is an exploded perspective view of a battery cover waterproofing apparatus in a portable terminal according to an embodiment of the present invention.
Figure 4:
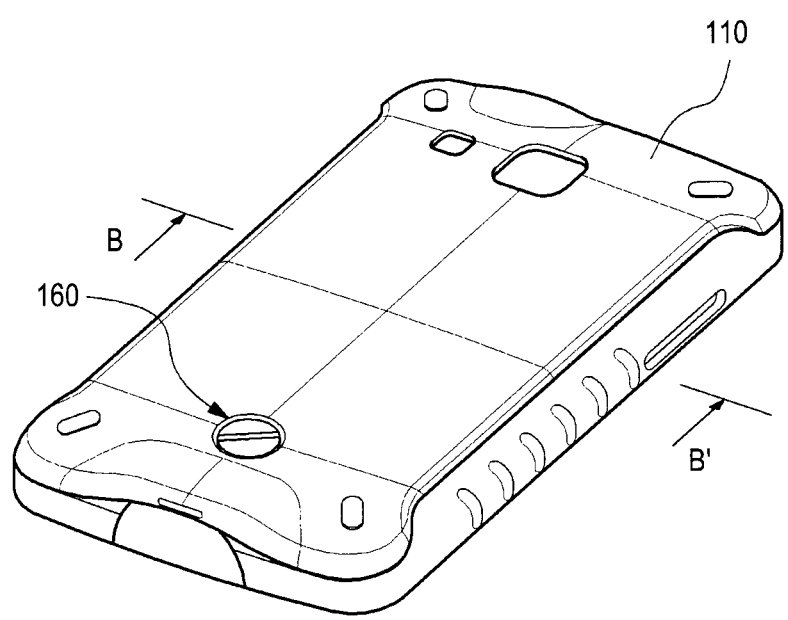
FIG. 4 illustrates the battery cover waterproofing apparatus illustrated in FIG. 3 in an assembled state.
Figure 5:
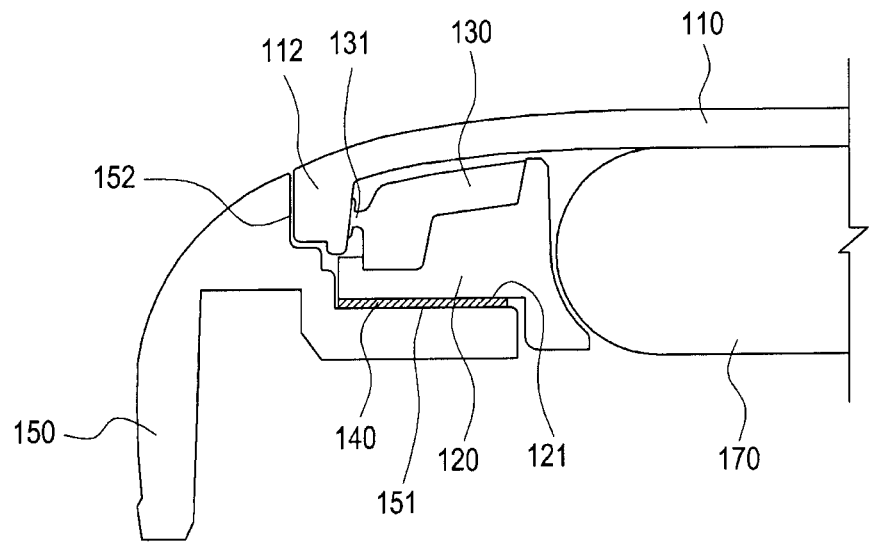
FIG. 5 is a sectional view of the battery cover waterproofing apparatus, taken along line B-B' illustrated in FIG. 4.

With reference to FIGS. 3, 4 and 5, the structure of an apparatus for waterproofing a battery cover in a portable terminal according to an embodiment of the present invention will be described below. FIG. 3 is an exploded perspective view of the battery cover waterproofing apparatus in the portable terminal according to the embodiment of the present invention.

Referring to FIG. 3, a portable terminal 100 includes a rear case 150 to be mounted on a rear surface of a body (not shown), a battery cover 110 for covering the rear case 150, and a waterproofing module 120, 130 and 140. The rear case 150 is mounted on the rear surface of the body. An opening S is formed into the shape of a battery 170 in the rear case 150, for accommodating the battery 170. Since the waterproofing module 120, 130 and 140 which will be described later is disposed along an inner surface 152 of the opening S, the opening S is preferably larger than the shape of the battery 170 in the embodiment of the present invention. A mounting surface 154 is formed on the rear case 150, on which the battery cover 110 can be mounted. The mounting surface 154 is recessed along the periphery of side surfaces of the rear case 150 so that a curved end portion 112 of the battery cover 110 may be inserted into the recess in the embodiment of the present invention. However, the mounting surface 154 is not limited to this specific configuration. In order to securely connect and engage the battery cover 110 with the rear case 150, the mounting surface 154 may have any engagement mechanism.

FIG. 4 illustrates the battery cover waterproofing apparatus illustrated in FIG. 3 in an assembled state and FIG. 5 is a sectional view of the battery cover waterproofing apparatus, taken along cross-sectional line B-B' illustrated in FIG. 4.

Referring to FIGS. 4 and 5, the waterproofing module 120, 130 and 140 is mounted along the periphery of the opening S, thereby sealing a water infiltration path between the battery cover 110 and the rear case 150, specifically a path of water leakage into a mounting area of the battery 170. As the waterproofing module 120, 130 and 140 is mounted to the rear case 150, particularly along the inner surface 152 of the opening S, that is, as the waterproofing module 120, 130 and 140 is horizontally disposed between the inner surface 152 of the opening S and an end portion of the battery 170, the waterproofing module 120, 130 and 140 seals the water infiltration path into the mounting area of the battery 170 without affecting the thickness of the portable terminal 100.

The waterproofing module 120, 130 and 140 will now be described in greater detail. The waterproofing module 120, 130 and 140 includes a waterproofing plate 120 formed into a square frame mounted along the inner surface 152 of the square opening S, for sealing the water infiltration path between the battery cover 110 and the rear case 150, and a waterproofing rubber 130 provided at the waterproofing plate 120. While the waterproofing plate 120 is described as a square frame in the embodiment of the present invention, the shape of the waterproofing plate 120 is not limited to square. For example, the waterproofing plate 120 may be shaped into a circle so long as it can seal and block the water infiltration path between the rear case 150 and the battery cover 110. The waterproofing rubber 130 is formed of a resilient elastic material, protruding along the periphery of an outer surface of the waterproofing plate 120 and includes a rubber protrusion 131 which protrudes toward the inner periphery of the opening S. Therefore, when the battery cover 110 is mounted to the portable terminal 100, the rubber protrusion 131 of the waterproofing rubber 130 is pressed against an inner surface of the curved end portion 112, thus blocking the water infiltration path. The waterproofing rubber 130 may typically be integrally molded with the waterproofing plate 120. Since the rear case 150 and the waterproofing module 120, 130 and 140 are molded into two separate structures and then engaged with each other, there is no need for providing a separate waterproofing apparatus to the battery cover 110. Furthermore, as the battery cover 110 is engaged with the rear case 150 in such a manner that the inner surface of the battery cover 110 directly faces the battery 170 and the rear case 150, the overall thickness of the portable terminal 100 is reduced.

The waterproofing module further includes an engagement member 140 which is interposed between a bottom surface 151 of the opening S and the waterproofing module components 120 and 130, particularly between the bottom surface 151 of the opening S and a bottom surface 121 of the waterproofing plate 120. In the embodiment of the present invention, the engagement member 140 includes a double-sided tape to securely position and retains the engagement member and the waterproofing module components 120 and 130. The double-sided tape is described by way of example, which should not be construed as limiting the present invention. Thus many modifications can be made, such as for example a rubber plate tightly interposed between the bottom surface 121 of the waterproofing plate 120 and the bottom surface 151 of the opening S to thereby block the water infiltration path or alternately a screw fixedly penetrating through the bottom surface 121 of the waterproofing plate 120 and the bottom surface 151 of the opening S to securely affix the waterproofing plate 120 to the bottom surface 151.

The battery cover 110 is provided on the rear surface of the portable terminal 100 to cover the whole surface of the rear case 150. An end portion of the battery cover 110 is curved toward the rear case 150 so as to be inserted into and retained within the mounting surface 154 formed along the periphery of the rear case 150. The curved end portion 112 of the battery cover 110 is inserted into the mounting surface 154 of the rear case 150, particularly between the mounting surface 154 and the waterproofing rubber 130, that is, between the mounting surface 154 and the rubber protrusion 131. As a consequence, the inner surface of the curved end portion 112 is brought into close contact with the rubber protrusion 131, thereby sealing the water infiltration path between the battery cover 110 and the rear case 150. As the curved end portion 112 of the battery cover 110 is inserted into the mounting surface 154, the battery cover 110 is engaged with the rear case 150, directly facing the battery 170. Since the battery cover 110 can be mounted, directly facing the battery 170, the inner surface of the curved end portion 112 closely contacts and forms a close interference fit with the rubber protrusion 131, thereby sealing the water infiltration path without increasing the overall thickness of the portable terminal 100. In addition, because the waterproofing module 120, 130 and 140 is attached to the rear case 150, the waterproofing module 120, 130 and 140 is not detached, which might otherwise be caused for example by bending of the battery cover 110 when the battery cover 110 is removed from the rear case 150. Accordingly, the sealing reliability of the waterproofing module 120, 130 and 140 is increased.

Referring again to FIGS. 3 and 4, to more stably lock the battery cover 110 with the rear case 150, the battery cover 110 further includes a secure locking unit 111, 153 and 160. In the embodiment of the present invention, the secure locking unit 111, 153 and 160 includes an engagement member 160 and first and second engagement holes 111 and 153, by way of example. That is, the first engagement hole 111 is formed into the battery cover 110, communicating the interior of the battery cover 110 with the exterior of the battery cover 110 so that the engagement member 160 may be inserted into the second engagement hole 153 through the first engagement hole 111. The second engagement hole 153 is formed into the surface of the rear case 150 at a position where the second engagement hole 153 communicates with the first engagement hole 110, when the battery cover 110 covers the rear case 150. In this manner, the engagement member 160 is engaged with the second engagement hole 153 through the first engagement hole 111. A catching groove (not shown) is formed around an inner surface of the second engagement hole 153, communicating with the second engagement hole 153. The catching groove is divided into a top-opened part and a top-closed part. When the engagement member 160 is inserted into the second engagement hole 153, a catching portion 162 is received by the catching groove and accommodated in the catching groove through the top-opened part. The engagement member 160 may then be rotated in this state, whereupon the catching portion 162 is then inserted and locked into the top-closed part of the catching groove. In the embodiment of the present invention, the engagement member 160 includes a head 161 exposed from an outer surface of the battery cover 110, a penetrating portion (not shown) extended vertically from the head 161, for penetrating through the first and second holes 111 and 153, and the catching portion 162 extended from the penetrating portion, in parallel to the head 161. A groove 161a is formed into the head 161. The engagement member 160 can be readily rotated by means of the groove 161a of the head 161 exposed outward from the battery cover 110.

However, the secure locking unit 111, 153 and 160 is not limited to the above-described configuration and many modifications can be made to the configuration of the secure locking unit 111, 153 and 160. For example, a hook is formed on the surface of the battery cover 110 and a catching loop is formed on the surface of the rear case 150 so that the hook may be caught into the catching loop, for stable locking, alternately threads may be provided within second engagement hole 153 and on engagement member 160. Thereby when engagement member 160 is inserted within the second engagement hole 153, the engagement member 160 may be rotated to securely affix the battery cover 110 to rear case 150.

Figure 6:
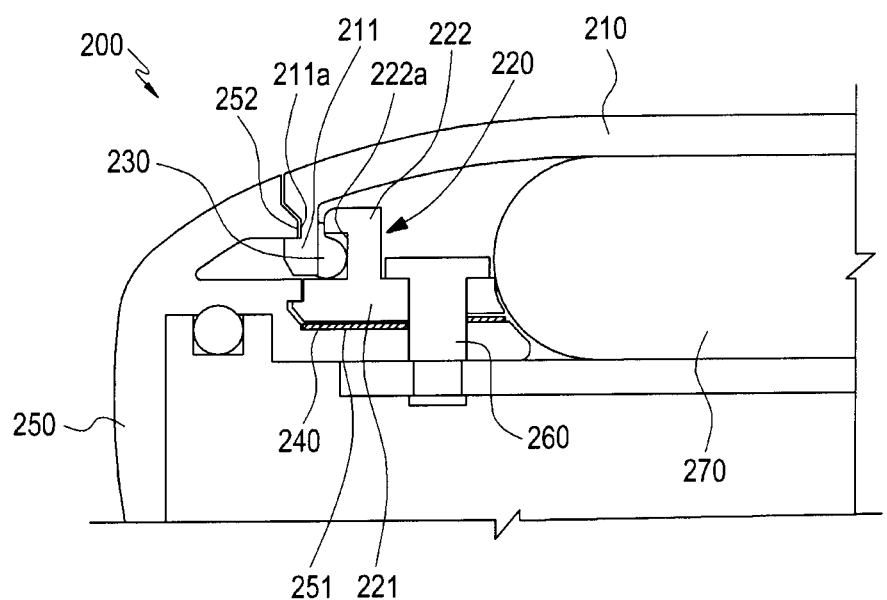
FIG. 6 is a sectional view of a battery cover waterproofing apparatus in a portable terminal according to another embodiment of the present invention.

Now a description will be given of an alternate exemplary waterproofing module 220, 230 and 240 in accordance with the present invention having a different configuration. FIG. 6 is a sectional view of a battery cover waterproofing apparatus in a portable terminal according to another embodiment of the present invention.

The waterproofing module described with reference to FIG. 6 and the waterproofing module described before with reference to FIGS. 3, 4 and 5 are similar in terms of engagement with the rear case 150 or 250 but different in terms of their structures. Compared to the waterproofing module 120, 130 and 140 including the integrally formed waterproofing plate 120 and waterproofing rubber 130 according to the foregoing embodiment of the present invention, the waterproofing module 220, 230, 240 illustrated in FIG. 6 includes a waterproofing plate 220 having a cross sectional shape that includes a bottom plate 221 with an inverted "L" shaped protrusion extending from the bottom plate 221 and thereby having a '⌐' shape, and an O-ring 230 fit around the waterproofing plate 220. More specifically, the waterproofing plate 220 is shaped into '⌐', including a bottom plate 221 mounted around the periphery of a bottom surface 251 of the opening S and a protrusion 222, extended from the bottom plate 221 and bent outwardly toward an inner surface of the opening S. Therefore, an insertion groove 222a is formed between the bottom plate 221 and the outwardly bent portion of protrusion 222, for allowing the O-ring 230 to be inserted thereinto. The O-ring 230 is inserted under the protrusion 222, particularly into the insertion groove 222a between the bottom plate 221 and the outwardly bent portion of protrusion 222. When a battery cover 210 is mounted on a rear case 250, the O-ring 230 is disposed between the protrusion 222 and an inner surface of a curved end portion 211. Thus the O-ring 230 is pressed tightly against the inner surfaces of the curved end portion 211, thereby sealing a water infiltration path. An engagement member 240 is interposed between the bottom plate 221 and a bottom surface 251 of the opening S to thereby engage the bottom plate 221 with the bottom surface 251 of the opening S and seal the water infiltration path between the bottom plate 221 and the bottom surface 251 of the opening S. In addition, an engagement portion 260 is further provided to engage the bottom plate 221 with the bottom surface 251 of the opening S. The engagement portion 260 is secured to and engaged with the bottom surface 251 of the opening S, penetrating through the bottom plate 221 and the engagement member 240. In this exemplary embodiment of the present invention, the engagement portion 260 is a screw and the engagement member 240 is a double-sided tape, however the present invention is not so limited and one skilled in the art will recognize that alternate engagement devices are possible within the scope of this invention. That is, many modifications can be made as far as they engage the bottom plate 221 with the bottom surface 25 of the opening S, sealing the water infiltration path. As the waterproofing plate 220 is mounted along the periphery of the opening S, horizontally to a battery 270, a portable terminal 200 can be made slim, while the thickness of the portable terminal 200 is not affected. An end portion of the battery cover 210 is formed into having a curved end portion 211 having a catching groove 211a, to be mounted on the mounting surface (154 in FIG. 3) formed along the periphery of the rear case 250. When the battery cover 210 covers one surface of the rear case 250, one surface of the curved end portion 211 of the battery cover 210 is caught with a hook 252 formed on the mounting surface 154 to securely position and retains battery cover 210 and the other surface of the curved end portion 211 closely contacts the O-ring 230, thereby blocking the water infiltration path.

In accordance with the forgoing two embodiments of the present invention, the waterproofing module 120, 130 and 140 and the waterproofing module 220, 230 and 240 are mounted along the inner periphery of the opening S. If the battery covers 110 and 210 are engaged with the portable terminals 100 and 200, the portable terminals 100 and 200 can be made slim, while the water infiltration paths are blocked.

In addition, because waterproofing module 120, 130 and 140 and waterproofing module 220, 230 and 240 are affixed to rear cases 150 and 250, when the battery covers 110 and 210 are removed from the rear cases 150 and 250, a possible bending of the battery covers 110 and 210 does not affect the waterproofing module 120, 130 and 140 and the waterproofing module 220, 230 and 240. Thus the battery covers 110 and 210 can be made thinner as there is no need for preventing the bending of the battery covers 110 and 210 to prevent damage to the waterproofing modules. The resulting slim-down of the battery covers 110 and 210 leads to reduction of the whole thickness of the portable terminals 100 and 200.

As is apparent from the above description, the battery cover waterproofing apparatus for a portable terminal according to the present invention has a waterproofing module disposed horizontally to a battery, thereby facilitating a slim construction of the portable terminal.

Since a curved surface is allowed for a battery cover, more complex and esthetically desirable product designs can be incorporated into the portable terminal design.

Because the waterproofing module is positioned horizontally to the battery, the conventional problem of removal of a battery cover from an inner waterproofing device can be avoided. As a consequence, the thickness of the battery cover can be reduced, thus facilitating a slim construction for a portable terminal.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An apparatus for waterproofing a battery cover in a portable terminal, comprising:
    a rear case including a battery compartment and an opening for accessing said battery compartment;
    a battery cover for covering the rear case; and
    a waterproofing module interposed between the rear case and the battery cover, along an inner periphery of the opening, and provides a water tight seal between the battery cover and the rear case,
    wherein the waterproofing module comprises:
    a waterproofing plate integrally formed with the rear case and disposed along a periphery of a bottom surface of the opening; and
    a waterproofing elastic seal formed integrally with the waterproofing plate and positioned to be pressed against an inner surface of the battery cover, when the battery cover is mounted on the rear case,
    wherein the waterproofing elastic seal further includes an elastic protrusion protruding toward the inner surface of the battery cover and laterally presses the inner surface of the battery cover, when the battery cover is mounted on the rear case for sealing the water infiltration path;
    wherein the waterproofing module further comprises an engagement member for securing the waterproofing module along the periphery of the bottom surface of the opening; and
    wherein the engagement member includes a double-sided tape disposed on the rear case.

2. The apparatus of claim 1, further comprising a secure locking unit for stably locking the battery cover with the rear case.

3. The apparatus of claim 2, wherein the secure locking unit comprises:
   a first engagement hole penetrating through the an interior and exterior of the battery cover;
   a second engagement hole formed into the rear case, communicating with the first engagement hole; and
   a second engagement member for being inserted into the second engagement hole through the first engagement hole.

4. The apparatus of claim 1, wherein the waterproofing module comprises:
   the waterproofing plate disposed along the periphery of the bottom surface of the opening, including a protrusion having a bent portion to protrude toward an inner surface of the opening; and
   an O-ring inserted under the bent portion of the protrusion and pressed between the protrusion and an inner surface of the battery cover when the battery cover is mounted on the rear case.

5. The apparatus of claim 4, wherein the battery cover is disposed between the inner surface of the opening and the bent portion of the protrusion and the O-ring is pressed against the inner surface of the battery cover, for sealing the battery cover.

6. An apparatus for waterproofing a battery cover in a portable terminal, comprising:
   a waterproofing module for providing a seal between the portable terminal and the battery cover,
   wherein the waterproofing module is disposed in a battery mounting compartment of the portable terminal,
   wherein the waterproofing module comprises:
   a waterproofing plate disposed along a periphery of a bottom surface of the battery mounting area;
   a waterproofing elastic seal formed integrally with the waterproofing plate, and
   an engagement member for securing the waterproofing plate along the periphery of the bottom surface of the battery mounting area;
   wherein an elastic protrusion protruding along an outer surface of the waterproofing elastic seal is laterally pressed against an inner surface of a battery cover, sealing a water infiltration path between the portable terminal and the battery cover when the battery cover is mounted on a rear case of the portable terminal, and
   wherein the engagement member includes a double-sided tape disposed on the rear case.

7. The apparatus of claim 6, further comprising a secure locking unit for stably locking the battery cover with the portable terminal.

8. The apparatus of claim 1, wherein the battery cover is detachably connectable to the rear case, the battery cover comprising a portion curved toward the rear case when the battery cover is detachably connected and wherein the waterproofing elastic seal laterally presses against the portion curved toward the rear case.

* * * * *